United States Patent
Li et al.

(10) Patent No.: US 10,502,057 B2
(45) Date of Patent: Dec. 10, 2019

(54) SYSTEM AND METHOD FOR BLADE ACCESS IN TURBOMACHINERY

(71) Applicant: General Electric Company, Schenectady, NY (US)

(72) Inventors: Qiang Li, Mason, OH (US); Toby George Darkins, Jr., West Chester, OH (US)

(73) Assignee: General Electric Company, Schenectady, NY (US)

( * ) Notice: Subject to any disclaimer, the term of this patent is extended or adjusted under 35 U.S.C. 154(b) by 625 days.

(21) Appl. No.: 14/717,861

(22) Filed: May 20, 2015

(65) Prior Publication Data

US 2016/0341043 A1    Nov. 24, 2016

(51) Int. Cl.
| | | |
|---|---|---|
| F01D 5/00 | (2006.01) | |
| F01D 25/24 | (2006.01) | |
| F01D 5/02 | (2006.01) | |
| F01D 5/12 | (2006.01) | |
| F04D 29/32 | (2006.01) | |
| F04D 29/52 | (2006.01) | |
| F04D 29/64 | (2006.01) | |

(52) U.S. Cl.
CPC .............. *F01D 5/005* (2013.01); *F01D 5/02* (2013.01); *F01D 5/12* (2013.01); *F01D 25/24* (2013.01); *F01D 25/243* (2013.01); *F04D 29/324* (2013.01); *F04D 29/522* (2013.01); *F04D 29/644* (2013.01); *F05D 2230/72* (2013.01); *F05D 2230/80* (2013.01); *F05D 2260/80* (2013.01); *Y02E 20/16* (2013.01)

(58) Field of Classification Search
CPC ........ F01D 5/005; F01D 25/24; F01D 25/243; F04D 29/522; F04D 29/644; F05B 2230/70; F05B 2230/80; F05B 2260/80; F05D 2230/70; F05D 2230/72; F05D 2230/80; F05D 2260/80
USPC ........................................ 415/118, 201, 214.1
See application file for complete search history.

(56) References Cited

U.S. PATENT DOCUMENTS

| | | | | |
|---|---|---|---|---|
| 3,303,998 A | * | 2/1967 | Koff ........................ | F01D 9/042 415/209.1 |
| 3,985,465 A | * | 10/1976 | Sheldon .................. | F01D 5/027 415/189 |
| 6,113,349 A | * | 9/2000 | Bagepalli ................ | F01D 11/08 415/135 |

(Continued)

FOREIGN PATENT DOCUMENTS

| | | |
|---|---|---|
| CA | 2 663 751 A1 | 4/2008 |
| CN | 103835775 A | 6/2014 |

(Continued)

OTHER PUBLICATIONS

European Search Report and Opinion issued in connection with corresponding EP Application No. 16169681.0 dated Oct. 10, 2016.

(Continued)

*Primary Examiner* — Christopher Verdier
(74) *Attorney, Agent, or Firm* — Dority & Manning, P.A.

(57) ABSTRACT

A system includes a turbomachine with a plurality of blades, a casing disposed about the rotor and the plurality of blades, an access opening disposed in the casing, and an access panel selectively coupled to the access opening, such that the access opening is sized to enable repair or replacement of at least one blade of the plurality of blades.

22 Claims, 7 Drawing Sheets

(56) References Cited

U.S. PATENT DOCUMENTS

| | | |
|---|---|---|
| 6,818,252 B1 | 11/2004 | Bornstein et al. |
| 6,971,842 B2 | 12/2005 | Luniewski et al. |
| 7,249,929 B2 | 7/2007 | Cummings et al. |
| RE43,928 E | 1/2013 | Clouse et al. |
| 8,596,965 B2 | 12/2013 | Merry et al. |
| 8,662,827 B2 | 3/2014 | Schutz |
| 8,820,148 B2 | 9/2014 | McCarvill |
| 9,279,342 B2 | 3/2016 | Davi et al. |
| 2005/0063821 A1 | 3/2005 | Luniewski et al. |
| 2005/0132707 A1* | 6/2005 | Gebhardt ................ F01D 9/042 60/726 |
| 2010/0074768 A1 | 3/2010 | Maier |
| 2012/0119633 A1* | 5/2012 | McCarvill ............... F01D 25/24 312/237 |
| 2012/0195746 A1* | 8/2012 | Sarda ..................... F01D 9/042 415/201 |
| 2012/0272496 A1* | 11/2012 | Herbold ................ F01D 25/285 29/402.03 |
| 2014/0003926 A1 | 1/2014 | Steffen et al. |
| 2014/0140839 A1* | 5/2014 | Davi ....................... F01D 25/24 415/214.1 |
| 2014/0271092 A1* | 9/2014 | Davi ....................... B66C 23/18 414/800 |
| 2014/0294581 A1* | 10/2014 | Rivers ..................... F01D 25/24 415/214.1 |
| 2015/0226231 A1* | 8/2015 | Murdock .............. F04D 29/403 60/726 |
| 2016/0214729 A1 | 7/2016 | Beljambe et al. |

FOREIGN PATENT DOCUMENTS

| | | |
|---|---|---|
| EP | 1531236 | 3/2011 |
| GB | 536461 A | 5/1941 |
| GB | 2 328 477 A | 2/1999 |
| JP | H10-317913 A | 12/1998 |
| WO | 2015/033042 A1 | 3/2015 |
| WO | WO2015/033042 A1 | 3/2015 |

OTHER PUBLICATIONS

Unofficial English Translation of Japanese Office Action issued in connection with corresponding JP Application No. 2016095707 dated Apr. 18, 2017.

Unofficial English Translation of Chinese Office Action issued in connection with corresponding CN Application No. 201610336571.1 dated Jun. 26, 2017.

Unofficial English Translation of Korean Office Action issued in connection with corresponding KR Application No. 10-2016-0061953 dated Jun. 29, 2017.

Unofficial English Translation of Japanese Notice of Allowance issued in connection with corresponding JP Application No. 2016095707 dated Sep. 5, 2017.

Chinese Office Action Corresponding to CN Application No. 2016103365711 dated Jun. 26, 2017.

Japanese Notice of Preliminary Rejection Corresponding to JP Application JP2016-095707, dated Apr. 18, 2017.

* cited by examiner

SYSTEM AND METHOD FOR BLADE ACCESS IN TURBOMACHINERY

BACKGROUND OF THE INVENTION

The subject matter disclosed herein relates to a system and method for servicing a turbomachine, such as a compressor or a turbine.

A turbomachine, such as a compressor or a turbine, includes internal blades, vanes, seals, shrouds, and other components that can wear over time. For example, the blades may be subjected to high temperatures, high pressures, high flow rates, and/or corrosive fluids, which can reduce the life of the blades. Unfortunately, the turbomachine is generally shutdown for service procedures, e.g., inspection, repair, and/or replacement of the internal components (e.g., blades) of the turbomachine. For example, the service procedures may involve substantial disassembly of the turbomachine in order to gain access to the internal components (e.g., blades).

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine with a plurality of blades, a casing disposed about the rotor and the plurality of blades, an access opening disposed in the casing, and an access panel selectively coupled to the access opening, such that the access opening is sized to enable repair or replacement of at least one blade of the plurality of blades.

In a second embodiment, a system includes a turbomachine access panel configured to selectively couple to an access opening in a casing disposed about a rotor having a plurality of blades of a turbomachine, such that the access panel is sized to enable repair or replacement of at least one blade of the plurality of blades.

In a third embodiment, a method includes selectively enabling access to a plurality of blades coupled to a rotor of a turbomachine via an access panel coupled to an access opening in a casing of the turbomachine, such that the access opening is sized to enable repair or replacement of at least one blade of the plurality of blades. In certain embodiments, the method may include inspecting at least one blade of the plurality of blades for cracks, breakage, wear, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide a system and method for accessing internal parts (e.g., blades, vanes, seals, shrouds, etc.) of a turbomachine (e.g., turbine, compressor) using one or more access panel assemblies in a casing. The casing of the turbomachine surrounds a plurality of internal components, such as a rotor, a plurality of blades coupled to the rotor, seals, stationary vanes, and/or shrouds. Each access panel assembly, including an access panel removably coupled to an access opening, is disposed within the casing. The access panel assembly enables an operator (e.g., service technician) to access the blades or other internal components inside the casing. The operator may then replace, repair, remove, install, or otherwise service the blades and/or blade platform, without substantially disassembling the turbomachine. Instead, the access panel enables the operator to access the blade (or other internal components) without removing the casing and various hardware coupled to the casing, e.g., fluid conduits, communications lines, mounting hardware, etc. As such, the service procedure may consume considerably less time and resources, thus improving production efficiencies and reducing costs associated with blade replacement and/or maintenance. In some embodiments, an access panel is selectively coupled to the access opening, and the access opening is sized to enable inspection, repair, and/or replacement of 1, 2, 3, 4, 5, or more stages of blades (e.g., compressor or turbine blades). The access opening may be sized to enable access to various stages of blades in the axial or circumferential directions (e.g., 1 to 5 blades in each direction). For example, the access opening may extend along less than 10, 20, 30, 40, or 50 percent of an axial length of the casing and/or the number of stages, and the access opening may extend around less than 5, 10, 15, 20, 25, 30, 40, 50, or 60 degrees of a circumference of the casing.

The access panel assembly may include a casing mounting frame, a casing mounting bracket, a panel mounting frame, and a panel mounting bracket. More specifically, the casing mounting frame is coupled to the casing mounting bracket, and the panel mounting frame is coupled to the panel mounting bracket. The casing mounting frame and the panel mounting frame are coupled to each other via a plurality of fasteners and/or a coupling joint (e.g., pivot joints, rotational joints). The access panels may be disposed anywhere along the casing in the axial direction and the circumferential direction (e.g., rotational direction). In some embodiments, the access panel (and the access opening) may be located at an axial end (e.g., end panel, end mounting interface, intermediate mounting interface, casing split) and/or along a rotational axis of the turbomachine. In some embodiments, the casing may be segmented into two or more casing sections. For example, the casing may be segmented into a first casing section and a second casing section, and the access panel may be disposed along a first casing section. In other embodiments, the access panel may be disposed across a split connection. The split connection may be aligned with a rotational axis. In some embodiments, the split connection may be crosswise to the rotational axis and/or offset from the rotational axis. As described below, the access panel assembly enables access to internal components of a compressor or turbine. The access panel assemblies may be particularly useful in the high pressure stages of a turbomachine (e.g., compressor or turbine), e.g., final stages of a compressor and/or early stages of a turbine.

Figure 1:
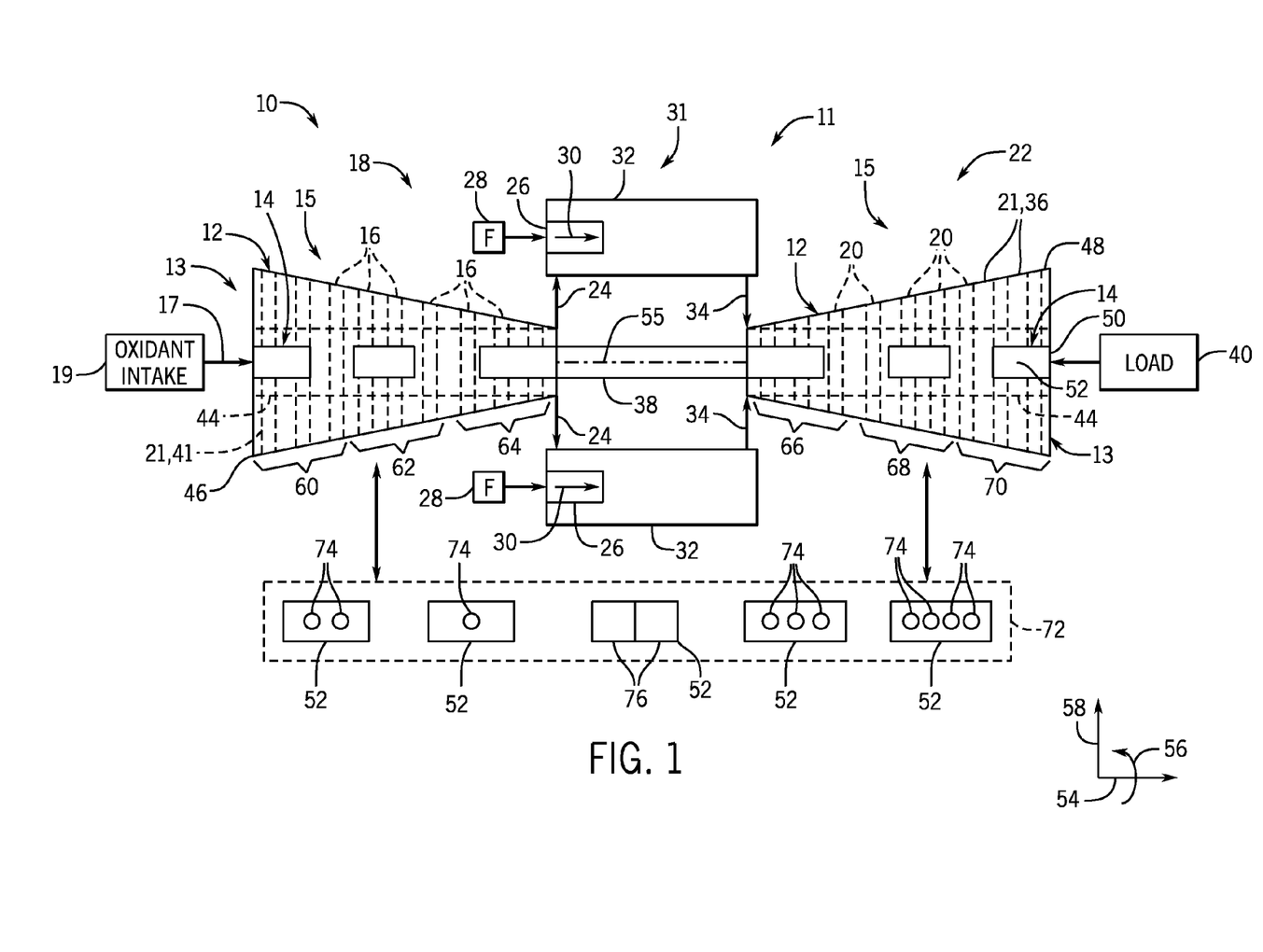
FIG. 1 is a schematic diagram of an embodiment of a system including a turbomachine having a plurality of access panel assemblies, including access openings and access panels, disposed in a casing across various compressor stages of a compressor and turbine stages of a turbine.

Now turning to the drawings, FIG. 1 is a schematic diagram of an embodiment of a system 10 including a turbomachine 11 (e.g., gas turbine engine) having a turbomachine casing 12 disposed about internal components 13, wherein the casing 12 includes a plurality of access panel assemblies 14 disposed across various turbomachine stages 15. The turbomachine stages 15 may include a plurality of compressor stages 16 (e.g., compression stages) in a compressor section or compressor 18 and a plurality of turbine stages 20 (e.g., expansion stages) in a gas turbine section or gas turbine 22. For example, the compressor 18 may include 1, 2, 3, 4, 5, 6, 7, 8, 9, 10, or more stages 16, while the gas turbine 22 may include 1, 2, 3, 4, 5, 6, 7, 8, 9, 10, or more stages 20. Each of the stages 15 includes a plurality of turbomachine blades 21, e.g., turbine blades 36 or compressor blades 42. Each access panel assembly 14 is configured to provide access through a limited section of the casing 12 to the internal components 13 (e.g., blades 21) of the turbomachine 11 (e.g., compressor 18 and/or turbine 22) without substantially disassembling the turbomachine 11. Details of the access panel assemblies 14 will be discussed in further detail below after discussing aspects of the turbomachine 11.

The compressor 18 intakes oxidant 17 (e.g., air) into the system 10 via an oxidant intake 19. As discussed herein, the oxidant 17 may include, but is not limited to, air, oxygen, oxygen-enriched air, oxygen-reduced air, or any combination thereof. The oxidant 17 (e.g., air) is taken in by the oxidant intake 19 into the system 10 via a suitable intake section, such as a cold air intake section, for subsequent delivery of the oxidant 17 into the compressor 18. The compressor 18 compresses the inlet oxidant 17, forming pressurized oxidant (e.g., compressed oxidant 24) by rotating blades 42 within the compressor 18. Each stage 16 of the compressor 18 may include a plurality of blades 42 (e.g., 10 to 100 or more), such as greater than 20, 30, 40, 50, 60, 70, 80, 90, or 100 blades 42. The compressor stages 16 progressively increase a pressure of the oxidant 24, and eventually output the compressed oxidant 24. As depicted, the compressed oxidant 24 enters one or more fuel nozzles 26, which mix the compressed oxidant 24 and a fuel 28 (e.g., a liquid fuel and/or gas fuel, such as natural gas) to produce an air-fuel mixture 30 suitable for combustion in a combustion section 31 having one or more combustors 32. The fuel nozzle 26 directs the air fuel mixture 30 into the one or more combustors 32, which ignite and combust the air-fuel mixture 30 to form combustion products 34. The combustion products 34 are directed to the gas turbine 22, where the combustion products 34 expand and drive blades 36 of the gas turbine 22 about a rotor 44. Each stage 20 of the turbine 22 may include a plurality of blades 36 (e.g., 10 to 100 or more), such as greater than 20, 30, 40, 50, 60, 70, 80, 90, or 100 blades 36. The gas turbine 22 is coupled to the compressor 18 and drives the compressor 18 by a common shaft 38. The gas turbine 22 may also drive a load 40 via the common shaft 38. Turbine blades 36 and compressor blades 42 are included as components of the gas turbine 22 and the compressor 18, respectively. The common shaft 38 may be coupled to several components (e.g., compressor 18, gas turbine 22, load 40) throughout the system 10. As will be appreciated, the load 40 may include electrical generator, a compressor, a propeller of an airplane, and so forth.

In some embodiments, the system 10 may include additional components such as an exhaust stack, silencer, control components, and/or heat recovery components. For example, the heat recovery components may include a heat recovery steam generator (HRSG), a steam turbine driven by steam from the HRSG, and an electrical generator driven by the steam turbine. Accordingly, the system 10 may be a combined cycle power plant having both the gas turbine engine 11 and the steam turbine, which uses heat in the exhaust gas from the gas turbine engine 11 to generate steam in the HRSG. The system 10 may generate power ranging from 10 MW to 100 MW or greater.

The turbomachine 11 (e.g., gas turbine engine) may include at least one casing 12 (e.g., turbomachine casing) having one or more access panel assemblies 14. The casing 12 may include a compressor casing 46 and/or a turbine casing 48. The compressor casing 12, 46 is disposed about the rotor 44 and the plurality of compressor blades 42. The turbine casing 12, 48 is disposed about the rotor 44 and the plurality of turbine blades 36. Each access panel assembly 14 may include one or more access openings 50 disposed in the casing 12 (e.g., compressor casing 46 and/or turbine casing 48), and one or more access panels 52 selectively coupled to (and removable from) the access opening 50. For example, the access panel 52 may be selectively removed from the access opening 50 to enable access to at least one internal component 13 of the turbomachine 11 (e.g., turbomachine blade 21, vane, seal, shroud, rotor, etc.). The turbomachine blade 21 may include a turbine blade 36 or a compressor blade 42.

The access opening 50 may be sized to enable inspection, repair, removal, insertion, and/or replacement of at least one turbomachine blade (e.g., 36, 42). For example, the access opening 50 may be sized to enable the removal or installation of at least one turbomachine blade (e.g., 36, 42), such that the entire blade and its platform (e.g., base) can pass through the access opening 50. For purposes of discussion, reference may be made to an axial direction or axis 54 along a rotational axis 55 of the turbomachine 12, a circumferential direction or axis 56 about the rotational axis 55, and a radial direction or axis 58 away from the rotational axis 55. In certain embodiments, the access opening 50 may overlap 1, 2, 3, 4, 5, 6, or more turbomachine blades 21 (e.g., 36, 42) in multiple directions, e.g., axial direction 54 and circumferential direction 56. For example, the access openings 50 may be sized to overlap 1 to 5 or 2 to 4 turbomachine blades 21 (e.g., 36, 42) in the axial direction 54 and the circumferential direction 56. The access openings 50 may include a plurality of equally sized openings, a plurality of differently sized openings, or a combination thereof. For example, from one opening 50 to another, the access openings 50 may be sized to overlap a uniform or different number of turbomachine blades 21 in the axial direction 54 and the circumferential direction 56.

The stages 15, 16 of the compressor 18 may include compression stages 16 across an upstream end portion 60, an intermediate portion 62, and/or a downstream end portion 64 in the axial direction 54. For example, each of the portions 60, 62, and 64 may include 1, 2, 3, 4, 5, or more compression stages 15, 16, wherein each compression stage 15, 16 includes a plurality of blades (e.g., compressor blades 42) coupled to the rotor 44. As illustrated, each of the portions 60, 62, and 64 includes an access panel assembly 14 to provide access to compressor blades 42. For example, in each of the portions 60, 62, and 64, the access opening 50 may overlap 1, 2, 3, 4, 5, 6, or more blades 42 in the axial direction 54 and the circumferential direction 56. In other words, the access opening 50 may be sized to axially overlap one or more blades 42 in a first stage in the upstream end portion 60, one or more blades 42 in a middle stage in the intermediate portion 62, and/or one or more blades 42 in a last or final stage in the downstream end portion 64.

Similarly, the stages 15, 20 of the turbine 22 may include turbine stages 20 across an upstream end portion 66, an intermediate portion 68, and/or a downstream end portion 70 in the axial direction 54. For example, each of the portions 66, 68, and 70 may include 1, 2, 3, 4, 5, or more turbine stages 15, 20, wherein each turbine stage 15, 20 includes a plurality of blades (e.g., turbine blades 36) coupled to the rotor 44. As illustrated, each of the portions 66, 68, and 70 includes an access panel assembly 14 to provide access to turbine blades 36. For example, in each of the portions 66, 68, and 70, the access opening 50 may overlap 1, 2, 3, 4, 5, 6, or more blades 36 in the axial direction 54 and the circumferential direction 56. In other words, the access opening 50 may be sized to axially overlap one or more blades 36 in a first stage in the upstream end portion 66, one or more blades 36 in a middle stage in the intermediate portion 68, and/or one or more blades 36 in a last or final stage in the downstream end portion 70.

In certain embodiments, the panels 52 may be selected from a family 72 of modular panels 52, which may have a variety of additional features. In some embodiments, one or more ports 74 may be disposed on the access panels 52. The ports 74 may be utilized to connect diagnostic equipment (e.g., borescope, optical instruments, surveying instruments) to the access panels 52, such that the compressor 18 and/or the turbine 22 may be examined by an operator. The access panels 52 may include 0, 1, 2, 3, 4, 5, 6, 7, 8, 9, or more ports disposed within one or more access panels 52. In some embodiments, the access panels 52 may be divided into one or more panel sections 76. For example, the access panels 52 may include 1, 2, 3, 4, 5, 6, or more panel sections 76. In some embodiments, the panel sections 76 may be symmetrical or asymmetrical. In some embodiments, the panel sections 76 may connect via one or more casing split connections. The casing split connections may be disposed along the access panel 52 in the axial direction 54 and/or the circumferential direction 56. For example, the access panel 52 may be split both axially 54 and circumferentially 56, such that the access panel 52 is divided into four sections. As may be appreciated, the access panel 52 may be split axially 54 and circumferentially 56 one or more times, resulting in any number (e.g., 2, 4, 6, 8, 10) of panel sections 76. In some embodiments, the panel sections 76 may individually enable selective access to internal components 13.

Figure 2:
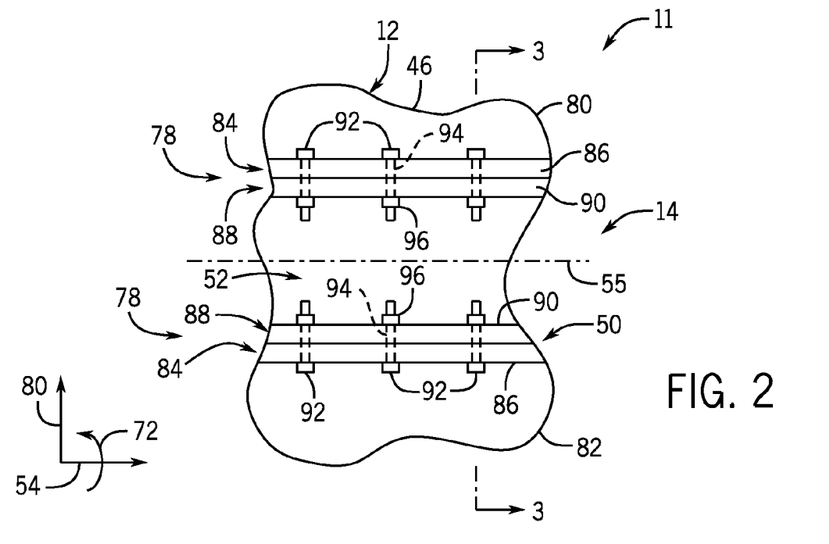
FIG. 2 is a partial side view of an embodiment of an access panel assembly disposed within a casing of FIG. 1.

FIG. 2 is a partial side view of an embodiment of an access panel 52 disposed within the casing 12 (e.g., 46, 48) of FIG. 1. In the following discussion of FIGS. 2-13, reference may be made to the access panel assembly 14 in context of the compressor 18 as an example, but the access panel assembly 14 is similarly applicable to the turbine 22. In the illustrated embodiment, the casing 12 (e.g., 46, 48) has a first casing section 80 and a second casing section 82, which may be coupled together at a plurality of casing split connections 78. For example, the casing sections 80 and 82 may be coupled together on opposite front and back sides of the casing 12 (e.g., 46, 48) via casing split connections 78. On the illustrated front side of the casing 12 (e.g., 46, 48), the casing sections 80 and 82 has a casing split connection 78 (e.g., upper and lower portions) that couples with the access panel assembly 14. At the access panel assembly 14, the casing split connection 78 includes a casing mounting frame 84 having a plurality of casing mounting brackets 86 (e.g., upper and lower brackets or flanges) coupled to the casing 12 (e.g., 46, 48) at casing sections 80 and 82. For example, the brackets 86 may be integrally formed as one-piece with each of the casing sections 80 and 82, or the brackets 86 may be welded to each of the casing sections 80 and 82. In addition, the casing split connection 78 includes a panel mounting frame 88 having a plurality of panel mounting brackets 90 (e.g., upper and lower brackets or flanges) coupled to the access panel 52. For example, the brackets 90 may be integrally formed as one-piece with the access panel 52, or the brackets 90 may be welded to the access panel 52. The casing mounting frame 84 and the panel mounting frame 88 are coupled to each other via a plurality of fasteners 92, such as threaded fasteners. In some embodiments, the fasteners 92 may include a plurality of male threaded fasteners 94 connected to a plurality of female threaded fasteners 96. The fasteners 92 may be disposed along the axial direction 54 and/or the fasteners may be disposed along the radial direction 58 to couple the components of the access panel assembly 14. Any number of fasteners 92 may be utilized to couple to the components of the access panel assembly 14, including 1 to 1000 or more fasteners.

Figure 3:
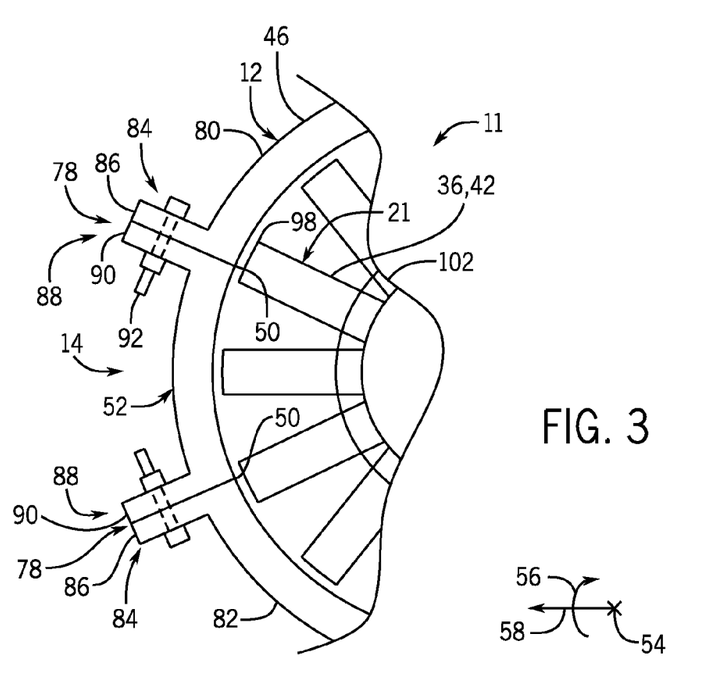
FIG. 3 is a partial cross-sectional view of an embodiment of the access panel assembly, taken along line 3-3 of FIG. 2.

FIG. 3 is a partial cross-sectional view of an embodiment of the access panel assembly 14, taken along line 3-3 of FIG. 2. In some embodiments, the casing 12 (e.g., 46, 48) may include one or more access openings 50 disposed in the circumferential direction 56 of the casing 12 (e.g., 46, 48). The casing 12 (e.g., 46, 48) is disposed around a plurality of turbomachine blades 21 (e.g., 36, 42) rotating in the circumferential direction 56. The access openings 50 may allow access to one or more stages 15 of the turbomachine blades 21 (e.g., 36, 42). In some embodiments, the access openings 50 may overlap 1, 2, 3, 4, 5, or more turbomachine blades 21 (e.g., 36, 42) in the axial direction 54 and/or the circumferential direction 56. For example, as illustrated, the access opening 50 overlaps two turbomachine blades 21 (e.g., 36, 42) in the circumferential direction 56. The access opening 50 enables an operator or technician to selectively access the turbomachine blades 21 (e.g., 36, 42) and/or blade tips 98 (e.g., turbine and/or compressor blade tips). The access opening 50 may enable the operator or technician to inspect, repair, replace, remove, and/or install the turbomachine blades 21 (e.g., 36, 42) and/or blade tips 98. For example, the access opening 50 is sized large enough to remove and/or install the entire turbomachine blade 21 (e.g., 36, 42), including the blade base or platform 102. As described above, the access panel assembly 14 is removably coupled to the casing 12 via the casing mounting frame 84 (e.g., upper and lower brackets 86) and the panel mounting frame 88 (e.g., upper and lower brackets 90) and fasteners 92. These mounting frames 84 and 88 may be disposed at the casing split connections 78 between casing sections 80 and 82, or away from the casing split connections 78 as further described below with reference to FIGS. 4 and 5.

Figure 4:
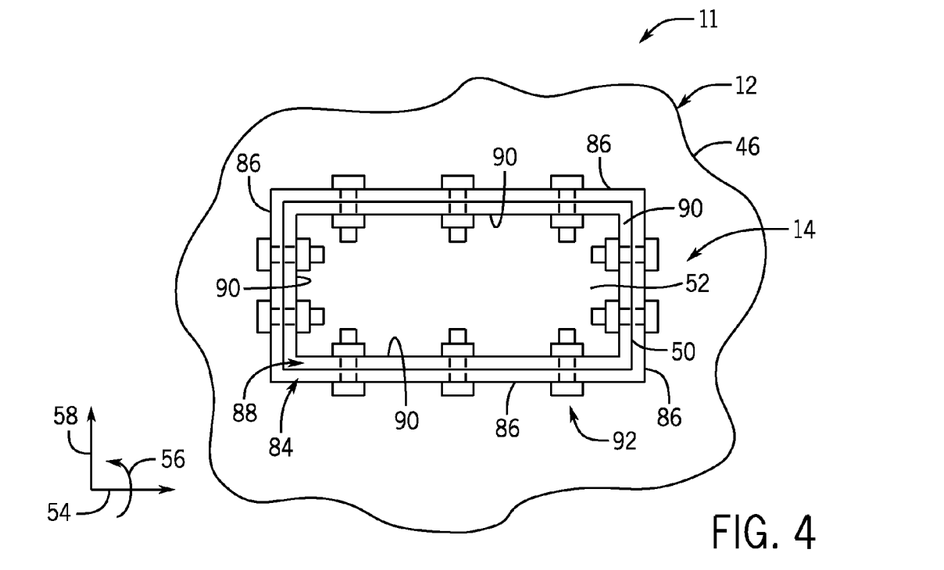
FIG. 4 is a partial side view of an embodiment of an access panel assembly disposed within a casing of FIG. 1.

FIG. 4 is a partial side view of an embodiment of the access panel assembly 14 disposed within the casing 12 (e.g., 46, 48) of FIG. 1, illustrated the access panel assembly 14 disposed in an intermediate region of the casing 12 away from any edges, ends, or split casing connections 78. In some embodiments, the access panel 52 may include a single panel access piece, as shown. In some embodiments, the casing 12 (e.g., 46, 48) may include one or more access openings 50 disposed in the circumferential direction 56 or the axial direction 54 of the casing 12 (e.g., 46, 48). The size of the access openings 50 may vary and enable access to one or more turbomachine blades 21 (e.g., 36, 42) in the axial direction 54 across one or more stages 15. Similarly, the size of the access openings 50 may enable access to one or more turbomachine blades 21 (e.g., 36, 42) in the circumferential direction 56, as described in further detail below. In the illustrated embodiment, the panel mounting frame 88 extends completely around the access opening 50, wherein the frame 88 includes four panel mounting brackets 90 (e.g., upper, lower, left, and right brackets or flanges). The casing mounting frame 84 extends completely around the panel mounting frame 88 and the access opening 50, wherein the frame 84 includes four casing mounting brackets 86 (e.g., upper, lower, left, and right brackets or flanges). The access panel 52 is removably coupled to the casing 12 over the access opening 50 via a plurality of fasteners 92 extending between the brackets 86, 90 in the frames 84, 88. The fasteners 92 may be disposed along the axial direction 54 and/or the fasteners 92 may be disposed along the radial direction 58 to couple the components of the access panel assembly 14. Any number of fasteners 92 may be utilized to couple to the components of the access panel assembly 14, including 1 to 1000 or more fasteners. For example, the each pair of upper brackets 86, 90, lower brackets 86, 90, left brackets 86, 90, and right brackets 86, 90 may include 1, 2, 3, 4, 5, 6, 7, 8, 9, 10, or more fasteners 92 (e.g., threaded fasteners). In some embodiments, the fasteners 92 may include a plurality of male threaded fasteners 94 fastened (e.g., coupled) to a plurality of female threaded fasteners 96. In the illustrated embodiment, the frames 84 and 88 are rectangular frames. In other embodiments, the frames 84 and 88 may be square frames, circular frames, oval frames, polygonal frames, or any other shaped frames.

Figure 5:
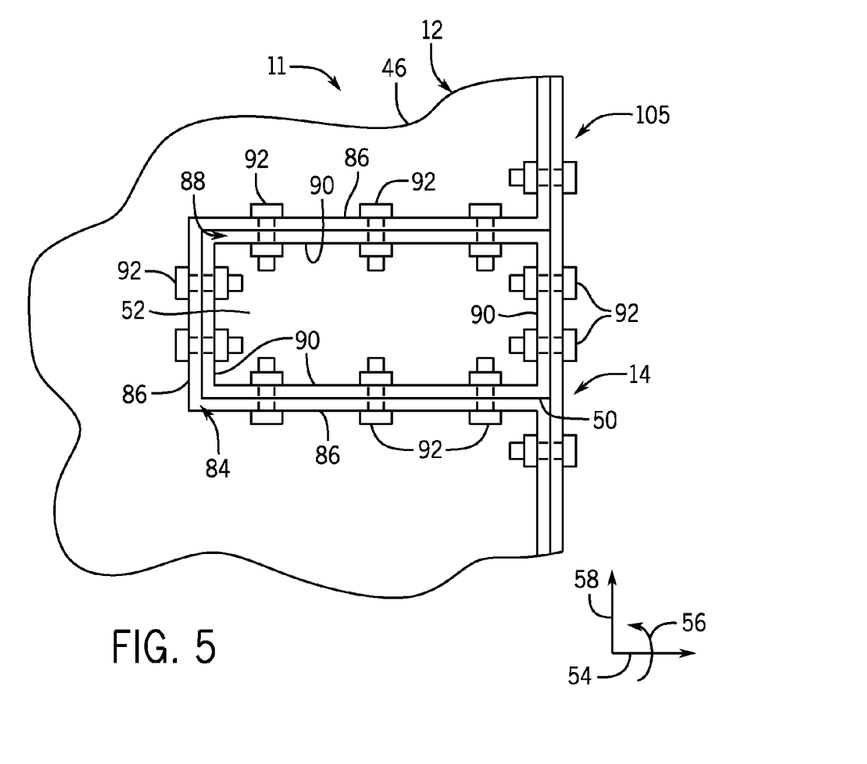
FIG. 5 is a partial side view of an embodiment of an access panel assembly disposed within a casing of FIG. 1, illustrating the access panel assembly extending to an axial end of the casing.
Figure 6:
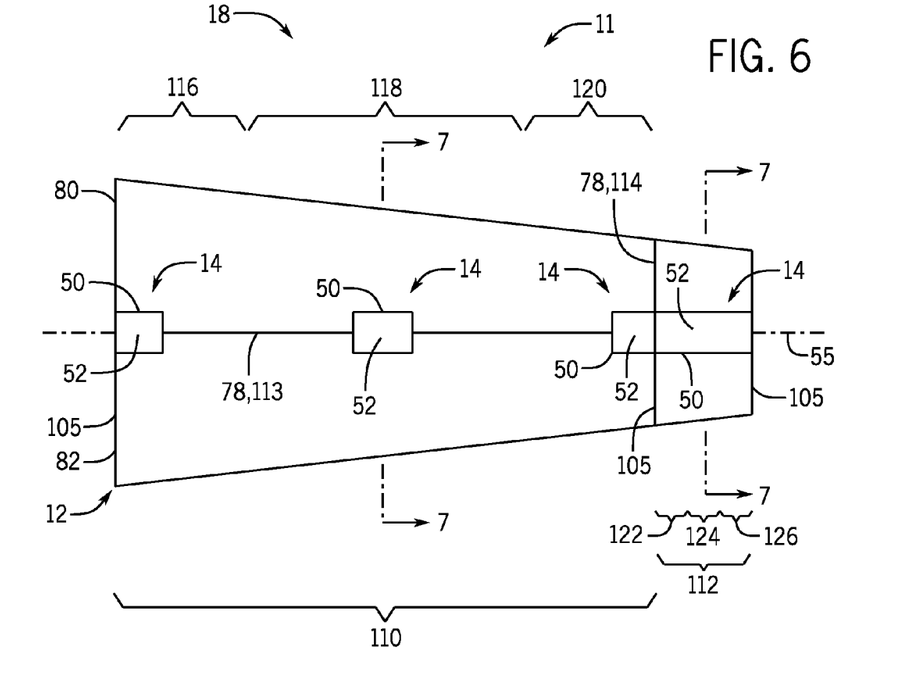
FIG. 6 is a side view of an embodiment of a casing of a turbomachine (e.g., compressor or turbine) having a plurality of access panel assemblies, including access openings and access panels, disposed across various stages of the turbomachine.

FIG. 5 is partial side view of an embodiment of the access panel assembly 14 disposed within the casing 12 (e.g., 46, 48) of FIG. 1, illustrating the access panel assembly 14 extending to an end 105 (e.g., axial end and/or circumferential end) of the casing 12 (e.g., 46, 48). In some embodiments, the end 105 may be an end panel, an end mounting interface, an intermediate mounting interface, or a casing split. The end 105 (e.g., axial end) may be disposed at an upstream end or a downstream end of the compressor 18 or the turbine 22 (e.g., 60, 64, 66, or 70). In some embodiments, the end 105 (e.g., axial end) may be an end mounting interface, which mounts to another section of the turbomachine 11. Accordingly, other equipment may be mounted onto the end mounting interface, including, but not limited to, a compressor discharge casing, a compressor intake section, a diffuser section of the turbine 22, exhaust conduit, flange, and so forth. In some embodiments, the end 105 (e.g., casing split) may be located between an upstream casing section (e.g., first casing section 110) and a downstream casing section (e.g., second casing section 112), as illustrated in FIG. 6. The end 105 (e.g., casing split) may also be disposed between regions within a casing section (e.g., 110, 112). For example, the casing split 105 may be disposed between an upstream region 116, an intermediate region 118, and/or a downstream region 120. In the illustrated embodiment, the panel mounting frame 88 extends completely around the access opening 50, wherein the frame 88 includes four panel mounting brackets 90 (e.g., upper, lower, left, and right brackets or flanges). The casing mounting frame 84 extends completely around the panel mounting frame 88 and the access opening 50, wherein the frame 84 includes four casing mounting brackets 86 (e.g., upper, lower, left, and right brackets or flanges). However, in the illustrated embodiment, a portion of the casing mounting frame 84 (right bracket 86) extends along the end 105.

FIG. 6 is a side view of an embodiment of a casing 12 of a turbomachine 11 (e.g., compressor 18 or turbine 22) having a plurality of access panel assemblies 14, including access openings 50 and access panels 52, disposed across various stages 15 (e.g., 16, 22) of the turbomachine 11. As will be appreciated, the casing 12 (e.g., 46, 48) may be segmented into a first casing section 110 (e.g., upstream casing section) and a second casing section 112 (e.g., downstream casing section). The first casing section 110 (e.g., upstream casing section) may be disposed about an upstream region 116, an intermediate region 118, and/or a downstream region 120 of the turbomachine 11 (compressor 18 or turbine 22). The second casing section 112 (e.g., downstream casing section) may include a first region 122, a second region 124, and a third region 126. In certain embodiments, one or more access panel assemblies 14 (e.g., access openings 50 and access panels 52) may be disposed along the turbomachine 11 (compressor 18 or turbine 22) in each of the casing sections 110, 112 and in each of the regions 116, 118, 120, 122, 124, and 126. As illustrated, some of the access panel assemblies 14 are disposed adjacent an end 105 of the sections 110, 112 (e.g., at upstream region 116, downstream region 120, first region 122, and third region 126). In the first casing section 110, each access panel assembly 14 may extend along less than a total axial length of the section 110, such as less than 5, 10, 15, 20, 25, 30, 45, or 50 percent of the total axial length. In the second casing section 112, the access panel assembly 14 may extend along all or part of the total axial length of the section 112. In certain embodiments, the access panel assembly 14 may be disposed along one or more casing split connections 78. For example, the casing split connection 78 may be disposed along the casing 12 (e.g., 46, 48) in the axial direction 54 (e.g., first casing split connection 113 along the rotational axis 55 of the turbomachine 11), or in the circumferential direction 56 (e.g., second split connection 114 crosswise to the rotational axis 55 of the turbomachine 11). In some embodiments, the access panel assembly 14 (e.g., access opening 50 and the access panel 52) may be disposed at an offset distance away from the split connection 78.

Figure 7:
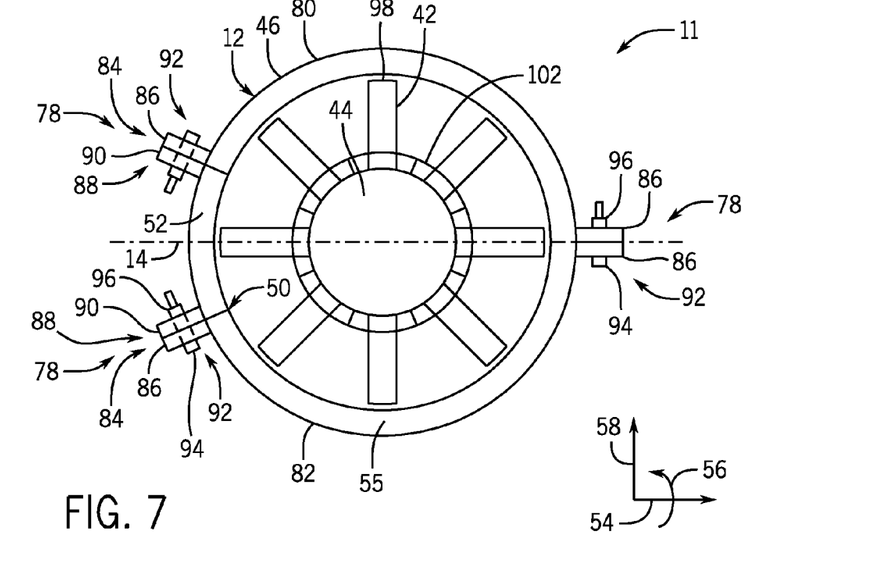
FIG. 7 is a cross-sectional view of an embodiment of the access panel assembly, taken along line 7-7 of FIG. 6.

FIG. 7 is a cross-sectional view of an embodiment of the access panel assembly 14, taken along line 7-7 of FIG. 6. In some embodiments, the casing 12 (e.g., 46, 48) may include one or more access openings 50 disposed in the circumferential direction 56 of the casing 12 (e.g., 46, 48). The casing 12 (e.g., 46, 48) is disposed around a plurality of turbomachine blades 21 (e.g., 36, 42) rotating in the circumferential direction 56. The access openings 50 may allow access to one or more stages 15 of the turbomachine blades 21 (e.g., 36, 42). In some embodiments, the access openings 50 may overlap 1, 2, 3, 4, 5, or more turbomachine blades 21 (e.g., 36, 42) in the axial direction 54 and/or the circumferential direction 56. For example, the access opening 50 may extend approximately 1 to 90, 5 to 60, 10 to 45, or 15 to 30 degrees in the circumferential direction 56 about the rotational axis 55. By further example, the access opening 50 may extend less than approximately 5, 10, 15, 20, 25, 30, 35, 40, 45, 50, 55, or 60 degrees in the circumferential direction 56 about the rotational axis 55. The access opening 50 enables an operator or technician to selectively access the turbomachine blades 21 (e.g., 36, 42) and/or blade tips 98 (e.g., turbine and/or compressor blade tips). The access opening 50 may enable the operator or technician to inspect, repair, replace, remove, and/or install the turbomachine blades 21 (e.g., 36, 42) and/or blade tips 98. For example, the access opening 50 is sized large enough to remove and/or install the entire turbomachine blade 21 (e.g., 36, 42), including the blade base or platform 102. As described above, the access panel assembly 14 is removably coupled to the casing 12 via the casing mounting frame 84 (e.g., rectangular frame 84 with upper, lower, left, and right brackets 86) and the panel mounting frame 88 (e.g., rectangular frame 88 with upper, lower, left, and right brackets 90) and fasteners 92. These mounting frames 84 and 88 may be disposed at the casing split connections 78 between casing sections 80 and 82. As illustrated, the access panel assembly 14 is disposed along casing split connections 78 on a left side of the casing 12, while a casing split connection 78 extends along a right side of the casing 12. The casing split connection 78 opposite from the access panel assembly 14 includes mating brackets 86 and fasteners 92.

Figure 8:
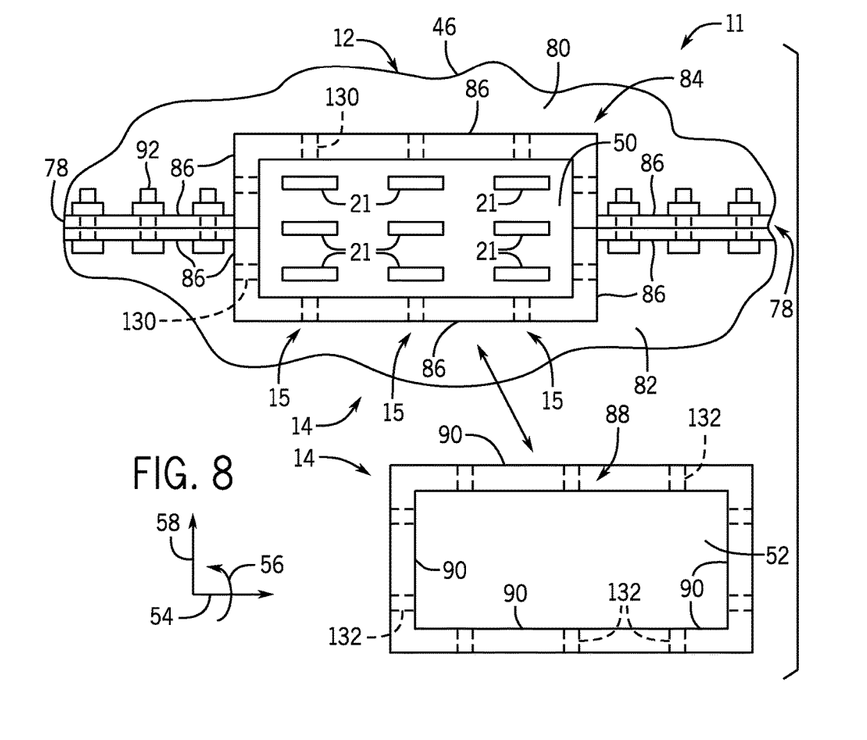
FIG. 8 is a partial exploded side view of an embodiment of the access panel assembly disposed in the casing of FIG. 6, illustrating an access panel removed from an access opening to expose a plurality of blades.

FIG. 8 is a partial exploded side view of an embodiment of the access panel assembly 14 of FIG. 6, illustrating the access opening 50 within the casing 12 (e.g., 46, 48) and the access panel 52 removed from the opening 50 to expose the turbomachine blades 21 (e.g., 36, 42). As will be appreciated, the access opening 50 may be sized to enable access to at least one turbomachine blade 21 (e.g., 36, 42) of the plurality of blades disposed about the rotor 44. In some embodiments, the access opening 50 may be sized to enable access to 1 to 20, 2 to 12, 3 to 9, or 4 to 6 turbomachine blades 21 (e.g., 36, 42) in the turbomachine 11 (e.g., compressor 18 or turbine 22). The access opening 50 may enable access to one or more stages 15 (e.g., compression stages 16 or turbine stages 20) of turbomachine blades 21 (e.g., 36, 42) in the axial direction 54 (e.g., opening length) and/or one or more turbomachine blades 21 in the circumferential direction 56 (e.g., opening width). For example, the access opening 50 may be sized to enable access to at least 1, 2, 3, 4, 5, or more stages 15 of the turbomachine blades 21 (e.g., 36, 42) in the axial direction 54, and 1, 2, 3, 4, 5, or more turbomachine blades 21 in the circumferential direction 56. In some embodiments, the access opening 50 may be positioned to axially 54 overlap the first stage (e.g., upstream end portion 60, 66), the last stage (e.g., downstream end portion 64, 70), or a middle stage (e.g., intermediate portion 62, 68) of the plurality of turbomachine blades 21 (e.g., 36, 42).

In the illustrated embodiment, a plurality of fastener receptacles 130 may be disposed through the casing mounting frame 84 at a plurality of spaced positions to receive the fasteners 92. The fastener receptacles 130 may be disposed through the brackets 86 along the length (e.g. axial direction 54) and/or the width (e.g., circumferential direction 56) of the casing mounting frame 84. Similarly, a plurality of fastener receptacles 132 may be disposed through the panel mounting frame 88 at a plurality of spaced positions to receive the fasteners 92. The fastener receptacles 132 may be disposed through the brackets 90 along the length (e.g. axial direction 54) and/or the width (e.g., circumferential direction 56) of the panel mounting frame 88. The fasteners 92 may include nuts, bolts, screws, male threaded fasteners 94, female threaded fasteners 96, left threaded fasteners, right threaded fasteners, and so forth. As further illustrated in FIG. 8, the casing split connection 78 includes the casing mounting brackets 86 (e.g., upper and lower brackets or flanges) extending axially away from upstream and downstream ends of the casing mounting frame 84, which surrounds the access opening 50. In other words, the brackets 86 diverge from one another (e.g., by a circumferential offset distance) to form the casing mounting frame 84 at the access panel assembly 14.

Figure 9:
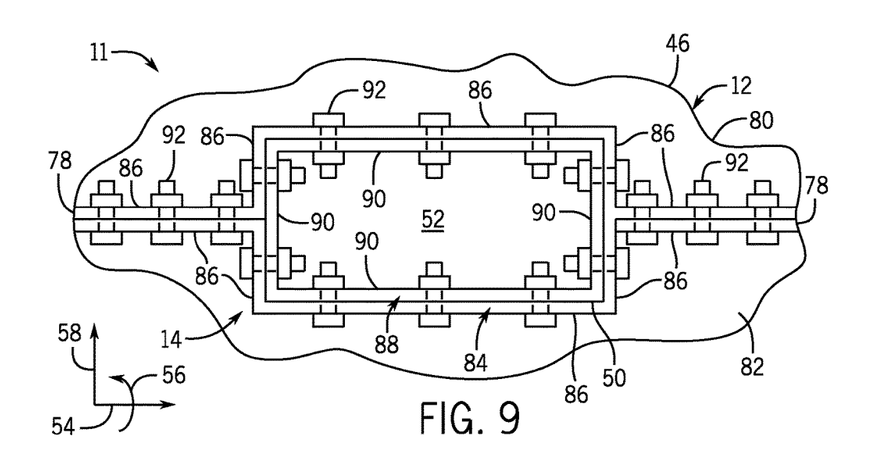
FIG. 9 is a partial side view of an embodiment of the access panel assembly of FIGS. 6 and 8, illustrating the access panel coupled to the access opening to cover the plurality of blades.

FIG. 9 is a partial side view of an embodiment of the access panel assembly 14 of FIGS. 6 and 8, illustrating the access opening 50 within the casing 12 (e.g., 46, 48) and the access panel 52 mounted over the opening 50 via fasteners 92. As will be appreciated, the access panel 52 is removably coupled to the casing mounting frame 84 when the access panel assembly 14 is assembled. The quantity of fasteners 92 disposed around the perimeter of the casing mounting frame 84 may vary. For example, the quantity of fasteners 92 disposed around the perimeter of the casing mounting frame 84 in the length (e.g., axial direction 54) and/or width direction (e.g., circumferential direction 56) can be approximately 1 to 1000 fasteners, 10 to 100 fasteners, or 25 to 50 fasteners, and all subranges therebetween.

Figure 10:
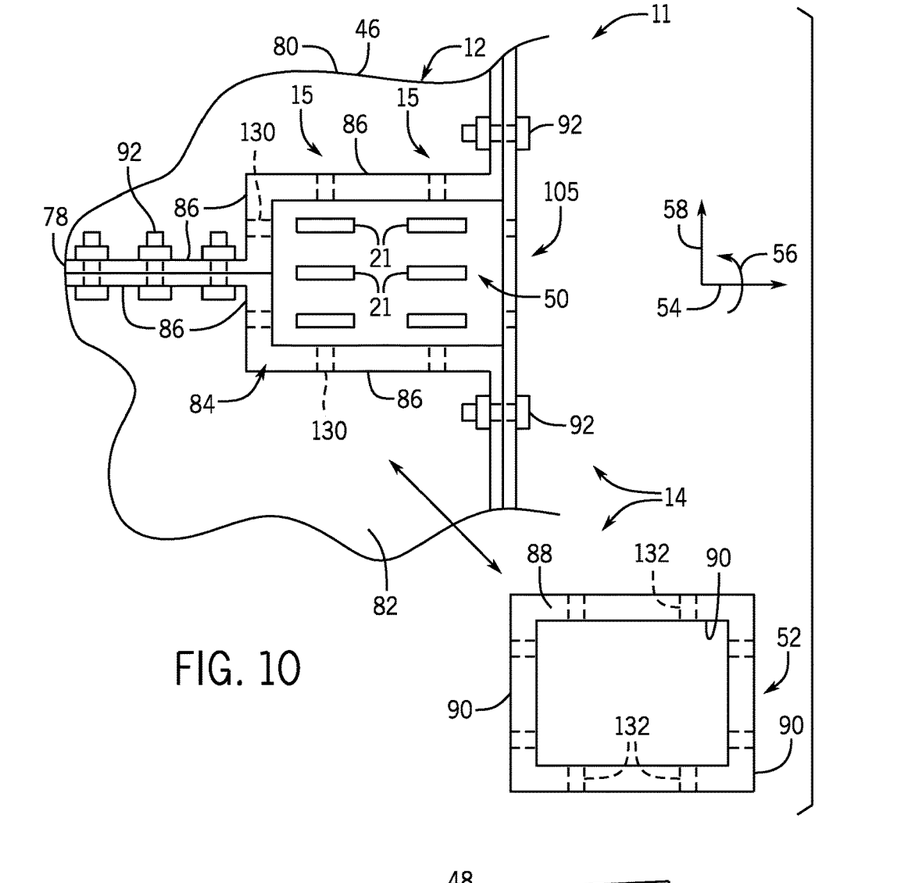
FIG. 10 is a partial exploded side view of an embodiment of the access panel assembly disposed at an axial end of the casing of FIG. 6, illustrating an access panel removed from an access opening to expose a plurality of blades.

FIG. 10 is a partial exploded side view of an embodiment of the access panel assembly 14 of FIG. 6, illustrating the access opening 50 within the casing 12 (e.g., 46, 48) and the access panel 52 removed from the opening 50 to expose the turbomachine blades 21 (e.g., 36, 42). In the illustrated embodiment, the access panel assembly 14 is disposed at an axial end 105 of the turbomachine 11 (e.g., compressor 18 or turbine 22). The access opening 50 may enable access to one or more stages 15 (e.g., 16, 20) of turbomachine blades 21 (e.g., 36, 42) in the axial direction 54 (e.g., opening length) and/or one or more turbomachine blades 21 in the circumferential direction 56 (e.g., opening width). In some embodiments, the access opening 50 may be sized to enable access to 1 to 20, 2 to 12, 3 to 9, or 4 to 6 turbomachine blades 21 (e.g., 36, 42) in the turbomachine 11 (e.g., compressor 18 or turbine 22). In some embodiments, the access opening 50 may be positioned to axially 54 overlap the first stage (e.g., upstream end portion 60, 66), the last stage (e.g., downstream end portion 64, 70), or a middle stage (e.g., intermediate portion 62, 68) of the plurality of turbomachine blades 21 (e.g., 36, 42).

As described above, the axial end 105 may be an end panel, an end mounting interface, an intermediate mounting interface, or a casing split. The end 105 (e.g., axial end) may be disposed at an upstream end or a downstream end of the compressor 18 or the turbine 22 (e.g., 60, 64, 66, or 70). In some embodiments, the end 105 (e.g., axial end) may be an end mounting interface, which mounts to another section of the turbomachine 11. As further illustrated in FIG. 10, the casing split connection 78 includes the casing mounting brackets 86 (e.g., upper and lower brackets or flanges) extending axially away from one end (i.e., opposite to the end 105) of the casing mounting frame 84, which surrounds the access opening 50. In other words, the brackets 86 diverge from one another (e.g., by a circumferential offset distance) to form the casing mounting frame 84 at the access panel assembly 14.

Figure 11:
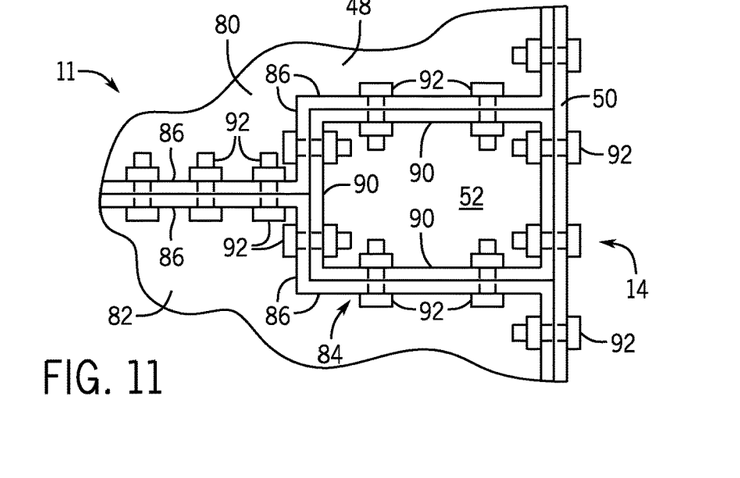
FIG. 11 is a partial side view of an embodiment of the access panel assembly of FIGS. 6 and 10, illustrating the access panel coupled to the access opening to cover the plurality of blades.

FIG. 11 is a partial side view of an embodiment of the access panel assembly 14 of FIGS. 6 and 10, illustrating the access opening 50 within the casing 12 (e.g., 46, 48) and the access panel 52 mounted over the opening 50 via fasteners 92. As will be appreciated, the access panel 14 is removably coupled to the casing mounting frame 84 when the access panel assembly 14 is assembled. The quantity of fasteners 92 disposed around the perimeter of the casing mounting frame 84 may vary. For example, the quantity of fasteners 92 disposed around the perimeter of the casing mounting frame 84 in the length (e.g., axial direction 54) and/or width direction (e.g., circumferential direction 56) can be approximately 1 to 1000 fasteners, 10 to 100 fasteners, or 25 to 50 fasteners, and all subranges therebetween.

Figure 12:
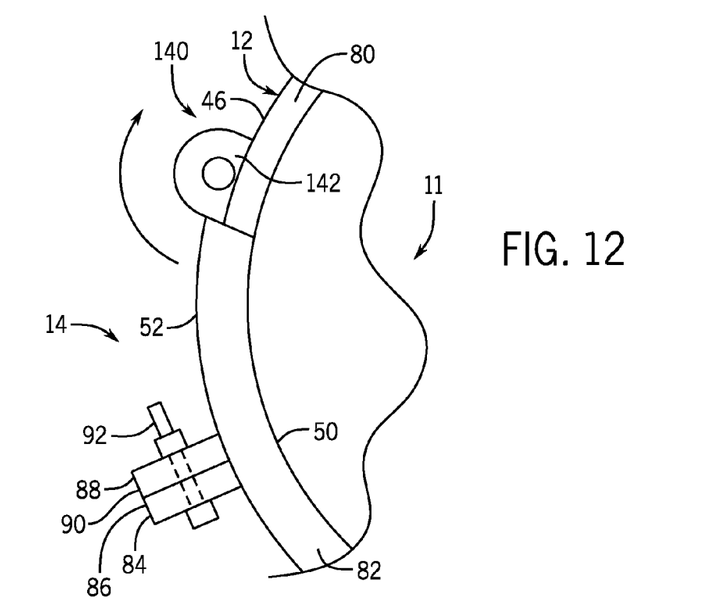
FIG. 12 is a partial cross-sectional view of an embodiment of an access panel assembly disposed in a casing of a turbomachine, illustrating an access panel coupled to the casing via a rotational joint and a fastener.

FIG. 12 is a cross-sectional view of an embodiment of the access panel assembly 14 coupled to the casing 12 (e.g., 46, 48) via a rotational joint 140 and one or more fastener 92. In some embodiments, the access panel assembly 14 may be disposed in the casing 12 (e.g., 46, 48) between one or more fasteners 92 and the rotational joint 140 (e.g., hinge). The rotational joint 140 enables the access panel 52 to swing open (e.g., upwards or downwards) in the circumferential direction 56 via a rotational shaft 142 (e.g., male rotational joint portion). As such, the access panel 52 may remain partially coupled to the casing 12 (e.g., 46, 48), while still allowing the operator to access (e.g., for repair, replacement, removal) the turbomachine blades 21 (e.g., 36, 42) removably coupled to the rotor 44 via blade platforms 102. As described above, the fasteners 92 couple the casing mounting frame 84 to the panel mounting frame 88.

Figure 13:
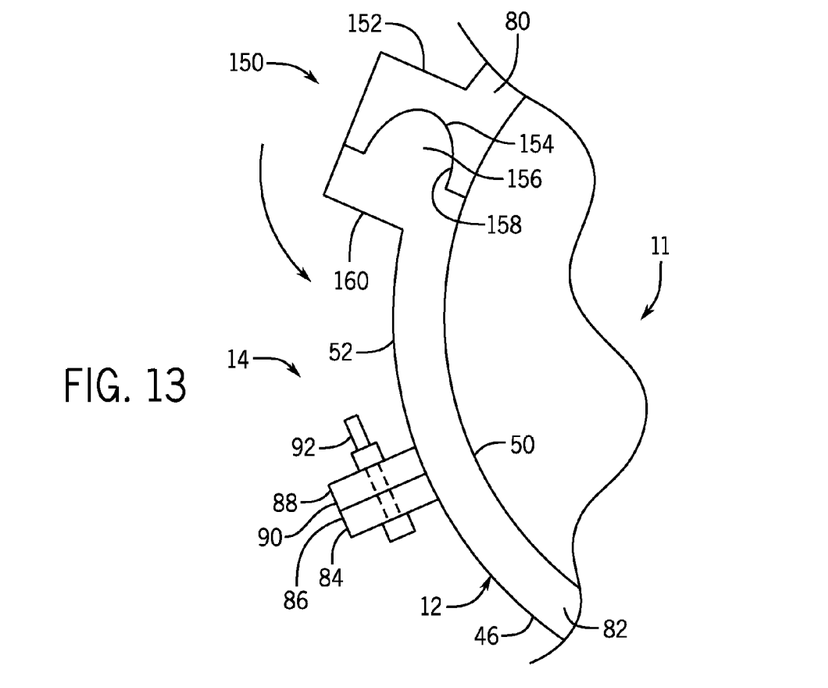
FIG. 13 is a partial cross-sectional view of an embodiment of an access panel assembly disposed in a casing of a turbomachine, illustrating an access panel coupled to the casing via a male-female joint (e.g., pivot joint) and a fastener.

FIG. 13 is a cross-sectional view of an embodiment of the access panel assembly 14 coupled to the casing 12 (e.g., 46, 48) via a pivot joint 150 and one or more fasteners 92. In some embodiments, the access panel assembly 14 may be disposed in the casing 12 (e.g., 46, 48) between one or more fasteners 92 and the pivot joint 150 (e.g., male-female joint). The pivot joint 150 may be mounted between a casing mounting bracket 152 and a panel mounting bracket 160. The pivot joint 150 enables the access panel 52 to pivot (e.g., inward or outward) when the fasteners 92 are not coupled to the brackets 86, 88 of the frames 84, 88. The pivot joint 150 has a curved interface 154 between a male joint portion 156 (e.g., protrusion, male dovetail portion) and a female joint portion 158 (e.g., slot, female dovetail portion), such that the pivot joint 150 can secure the access panel 52 without fasteners 92 on one side of the access panel assembly 14, while still employing the fasteners 92 on the opposite side of the access panel assembly 14.

In some embodiments, a method of servicing the blades 21 may include selectively accessing one or more blades 21 that are coupled to the rotor 44 of the turbomachine 12 through the access panel 52 coupled to the access opening 50. The method may include inspecting one or more blades 21 through the access opening 50 such that the blades 21 may be serviced through the access opening 50, if the blades 21 require service. The blades 21 may require service for a variety of reasons, including but not limited to, blade cracks, blade wear, breakage, fatigue, erosion, and so forth. The method may include rotating the rotor 44 of the turbomachine 12 such that one or more different blades 21 is accessible through the access opening 50. In some embodiments, the blades 21 may include blades 21 from one or more turbomachine stages 15. The method may include repeating the inspecting, servicing, and rotating of the different blades 21 until each blade 21 of the turbomachine 12 has been inspected. In some embodiments, servicing the blades 21 may include repairing one or more blades 21 through the access opening 50. Servicing the blades 21 may include removing one or more blades 21 through the access opening 50 and installing one or more replacement blades 21 through the access opening 50.

Technical effects of the present disclosure include a system and method for accessing internal parts 13 (e.g., blades 21) of a turbomachine 11 (e.g., compressor 18 or turbine 22). An access panel assembly 14, including an access opening 50 and access panel 52, is disposed within the casing 12. The access panel assembly 14 enables an operator or user to access the blades 21 or other internal components 13 inside the casing 12. The operator may then replace, repair, remove, install, or otherwise service the blades 21 without substantially disassembling the turbomachine 11. The access opening 50 may be sized to enable access to 1, 2, 3, 4, 5, or more blades 21 in the axial or circumferential directions 54, 56. The access panel assemblies 14 may be disposed anywhere along the casing 12 in the axial or circumferential directions 54, 56, including intermediate regions and/or end regions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
   a turbomachine, comprising:
      a rotor comprising a plurality of blades;
      a casing disposed about the rotor and the plurality of blades, wherein the casing comprises a wall of the turbomachine, wherein the casing is segmented into a first casing section and a second casing section, and the first and second casing sections are coupled together and form an interface at a split connection;
      an access opening disposed in the casing, wherein a casing mounting frame including mounting brackets extends completely around the access opening; and
      an access panel selectively coupled to the access opening with a plurality of fasteners, wherein the access panel includes a panel mounting frame including a plurality of panel mounting brackets, wherein the casing mounting frame and panel mounting frame are selectively coupled together with the plurality of mounting brackets and the plurality of panel mounting brackets, wherein the access panel is sized smaller than each of the first and second casing sections, the access opening is sized to enable repair or replacement of at least one blade of the plurality of blades, wherein the access opening and the access panel are disposed directly at the split connection between the first and second casing sections, and the access opening and the access panel comprise a portion of the interface at the split connection, wherein at least one panel mounting bracket extends along the interface.

2. The system of claim 1, wherein the access opening is sized to enable inspection, removal or installation of a blade of the plurality of blades, and the portion of the interface is less than an entirety of the interface at the split connection.

3. The system of claim 1, wherein the rotor comprises a plurality of stages of the plurality of blades, and the access opening is sized to axially overlap at least one stage of the plurality of blades.

4. The system of claim 1, wherein the rotor comprises a plurality of stages of the plurality of blades, and the access opening is sized to axially overlap at least two stages of the plurality of blades.

5. The system of claim 1, wherein the rotor comprises a plurality of stages of the plurality of blades, and the access opening is sized to axially overlap at least three stages of the plurality of blades.

6. The system of claim 1, wherein the rotor comprises a stage of the plurality of blades arranged circumferentially one after another about the rotor, wherein the access opening is sized to overlap at least one blade of the plurality of blades in the stage.

7. The system of claim 1, wherein the rotor comprises a stage of the plurality of blades arranged circumferentially one after another about the rotor, wherein the access opening is sized to overlap at least two blades of the plurality of blades in the stage.

8. The system of claim 1, wherein the rotor comprises a stage of the plurality of blades arranged circumferentially one after another about the rotor, wherein the access opening is sized to overlap at least three blades of the plurality of blades in the stage.

9. The system of claim 1, wherein the rotor comprises a plurality of stages of the plurality of blades, and the access opening is sized to axially overlap a first stage, a last stage, or a middle stage of the plurality of blades.

10. The system of claim 1, wherein a second access opening and a second access panel are disposed at an offset distance away from the split connection between the first and second casing sections.

11. The system of claim 1, wherein the first casing section is disposed upstream from the second casing section, and the second casing section comprises the access opening.

12. The system of claim 1, wherein the turbomachine comprises a compressor, a turbine, or a combination thereof.

13. The system of claim 1, wherein the access panel is coupled to the access opening and the casing via a rotational joint or a pivot joint.

14. The system of claim 1, wherein the split connection is aligned with an axial axis of the turbomachine or a circumferential axis of the turbomachine.

15. The system of claim 1, wherein the turbomachine comprises a compressor.

16. A system, comprising:
   a turbomachine access panel configured to selectively couple to an access opening in a casing disposed about a rotor having a plurality of blades of a turbomachine, wherein the casing comprises a wall of the turbomachine and is segmented into a first casing section and a second casing section, and the first and second casing sections are coupled together at a split connection, wherein the turbomachine access panel is sized smaller than each of the first and second casing sections, the access panel is sized to enable repair or replacement of at least one blade of the plurality of blades, wherein a casing mounting frame including mounting brackets extends completely around the access opening, wherein the access panel includes a panel mounting frame including a plurality of panel mounting brackets, wherein the casing mounting frame and panel mounting frame are selectively coupled together with the plurality of mounting brackets and the plurality of panel mounting brackets, wherein the access panel is disposed directly at the split connection between the first casing section of the casing and the second casing section of the casing, and wherein at least one panel mounting bracket extends along the split connection.

17. The system of claim 16, comprising the casing having the turbomachine access panel selectively coupled to the access opening with a plurality of fasteners.

18. A method of servicing, comprising:
   selectively accessing at least one blade of a plurality of blades coupled to a rotor of a turbomachine via an access panel coupled to an access opening in a casing of the turbomachine with a plurality of fasteners, wherein the casing comprises a wall of the turbomachine and is segmented into a first casing section and a second casing section, the first and second casing sections are coupled together at a split connection, the access panel is sized smaller than each of the first and second casing sections, wherein a casing mounting frame including mounting brackets extends completely around the access opening, wherein the access panel includes a panel mounting frame including a plurality of panel mounting brackets, wherein the casing mounting frame and panel mounting frame are selectively coupled together with the plurality of mounting brackets and the plurality of panel mounting brackets, and the access panel is disposed directly at the split connection between the first casing section of the casing and the second casing section of the casing, and wherein at least one panel mounting bracket extends along the split connection.

19. The method of claim 18, wherein the selectively accessing comprises:
   inspecting the at least one blade of the plurality of blades through the access opening;
   servicing the at least one blade through the access opening if needing service;
   rotating the rotor of the turbomachine to position at least one different blade of the plurality of blades at the access opening; and
   repeating the inspecting, the servicing, and the rotating until each blade of the plurality of blades has been inspected.

20. The method of claim 19, wherein the inspecting comprises inspecting the at least one blade for cracks, breakage, wear, or a combination thereof.

21. The method of claim 19, wherein the servicing comprises:
   repairing the at least one blade through the access opening; or
   removing the at least one blade through the access opening and installing at least one replacement blade through the access opening.

22. The method of claim 18, wherein the turbomachine comprises a compressor, a turbine, or a combination thereof.

* * * * *